(12) United States Patent
Havewala et al.

(10) Patent No.: US 8,856,088 B2
(45) Date of Patent: Oct. 7, 2014

(54) APPLICATION-MANAGED FILE VERSIONING

(75) Inventors: Sarosh C. Havewala, Kirkland, WA (US); Matthew S. Garson, Seattle, WA (US); Neal R. Christiansen, Bellevue, WA (US); Hui Li, Malden, MA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/060,846

(22) Filed: Apr. 1, 2008

(65) Prior Publication Data

US 2009/0248757 A1   Oct. 1, 2009

(51) Int. Cl.
   *G06F 17/30*   (2006.01)
   *G06F 17/22*   (2006.01)
   *G06F 11/14*   (2006.01)

(52) U.S. Cl.
   CPC ........ *G06F 17/2288* (2013.01); *G06F 11/1451* (2013.01); *G06F 17/3023* (2013.01)
   USPC ............ 707/695; 707/611; 707/638; 707/639

(58) Field of Classification Search
   CPC .......... G06F 17/30067; G06F 17/2288; G06F 17/30011; G06F 17/3023; G06F 17/30309; G06F 17/30876; G06F 9/44536
   USPC ............... 707/203, 200, 999.203, 104.1, 610, 707/638, 695, 654, 611
   See application file for complete search history.

(56) References Cited

U.S. PATENT DOCUMENTS

| | | | |
|---|---|---|---|
| 5,729,744 A | 3/1998 | Gerken et al. | |
| 5,805,889 A | 9/1998 | Van De Vanter | |
| 6,272,678 B1 | 8/2001 | Imachi et al. | |
| 6,931,590 B2 | 8/2005 | Kanie et al. | |
| 6,957,235 B2 * | 10/2005 | Peairs et al. | 707/999.005 |
| 7,058,667 B2 | 6/2006 | Goldick | |
| 7,130,863 B2 * | 10/2006 | Diab | 707/999.103 |
| 7,257,595 B2 | 8/2007 | Verma et al. | |
| 7,289,973 B2 | 10/2007 | Kiessig et al. | |
| 7,395,386 B2 * | 7/2008 | Barrs et al. | 711/161 |

(Continued)

OTHER PUBLICATIONS

Santry et al., "Elephant: The File System that Never Forgets", Proceedings of the Seventh Workshop on Hot Topics in Operating Systems, 1999, pp. 6.

(Continued)

*Primary Examiner* — Jay Morrison
*Assistant Examiner* — Dangelino Gortayo
(74) *Attorney, Agent, or Firm* — John Jardine; Andrew Sanders; Micky Minhas

(57) ABSTRACT

In accordance with one or more aspects of the application-managed file versioning, a request to store a new version of a file is received from an application, the request having been generated by the application. A filename for the new version of the file is generated, derived from a standardized naming convention. The filename includes a first portion having at least a portion of a name of the file, and a second portion having data indicating that the new version of the file is a version of the file. A set of application programming interfaces (APIs) can be exposed that allow the application to manage file versions, such as creating a new version of a file, identifying one or more versions of the file, listing one or more versions of the file, and deleting one or more versions of the file.

20 Claims, 5 Drawing Sheets

(56) References Cited

U.S. PATENT DOCUMENTS

| | | | |
|---|---|---|---|
| 7,398,466 B2 * | 7/2008 | Jeon et al. | 715/229 |
| 7,421,458 B1 * | 9/2008 | Taylor et al. | 707/999.003 |
| 7,529,773 B2 * | 5/2009 | Rogers | 707/999.001 |
| 7,721,110 B2 * | 5/2010 | Kouznetsov et al. | 713/187 |
| 7,793,281 B2 * | 9/2010 | Goring et al. | 717/170 |
| 7,860,839 B2 * | 12/2010 | Cisler et al. | 707/654 |
| 7,877,680 B2 * | 1/2011 | Arun et al. | 715/229 |
| 7,990,396 B2 * | 8/2011 | McArdle et al. | 345/630 |
| 8,060,485 B2 * | 11/2011 | Carro | 707/705 |
| 8,156,090 B1 * | 4/2012 | Curles | 707/694 |
| 8,447,733 B2 * | 5/2013 | Sudhakar | 707/638 |
| 2002/0078069 A1 * | 6/2002 | Moore | 707/200 |
| 2003/0088557 A1 * | 5/2003 | Morino | 707/3 |
| 2004/0015369 A1 | 1/2004 | Kim et al. | |
| 2005/0076066 A1 * | 4/2005 | Stakutis et al. | 707/200 |
| 2006/0259516 A1 * | 11/2006 | Stakutis et al. | 707/200 |
| 2007/0083570 A1 | 4/2007 | Fineberg | |
| 2007/0094312 A1 * | 4/2007 | Sim-Tang | 707/204 |
| 2007/0220068 A1 | 9/2007 | Thompson et al. | |
| 2008/0065703 A1 * | 3/2008 | Wang et al. | 707/203 |
| 2008/0183773 A1 * | 7/2008 | Choy | 707/204 |
| 2008/0256138 A1 * | 10/2008 | Sim-Tang | 707/202 |
| 2009/0024674 A1 * | 1/2009 | Gallagher | 707/203 |
| 2009/0198709 A1 * | 8/2009 | Mishra et al. | 707/100 |

OTHER PUBLICATIONS

Larsen, et al., "Change Oriented Versioning and the EPOS Software Engineering Database", Proceedings of the 4th ERCIM Database Research Group Workshop, 1993, pp. 13.

* cited by examiner

APPLICATION-MANAGED FILE VERSIONING

BACKGROUND

Users sometimes accidentally lose data in a file they are working on. Some losses occur because users change their mind about an edit they made, such as deciding they want to keep a paragraph that they deleted the previous day. Other losses occur because users inadvertently delete a portion of a file, such as by not realizing they hit the delete key while certain words were selected. Such accidental data loss is problematic for users, and unfortunately is oftentimes irreversible by the time the user realizes the data has been lost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the application-managed file versioning, a request to store a new version of a file is received from an application. A filename for the new version of the file is generated. The filename includes a first portion having at least a portion of a name of the file, and a second portion having data indicating that the new version of the file is a version of the file.

In accordance with one or more aspects of the application-managed file versioning, an event in an application is identified, the event corresponding to an application-specific event. In response to the event being identified, the application determines that a new version of the file is to be saved. A request is sent to a file system module to save the new version of the file, the request including a name of the file for which the new version is to be saved.

In accordance with one or more aspects of the application-managed file versioning, a set of application programming interfaces (APIs) is exposed that allow an application running on a device to manage file versions. The set of APIs include one or more APIs to create a new version of a file and one or more APIs to identify one or more versions of the file.

BRIEF DESCRIPTION OF THE DRAWINGS

The same numbers are used throughout the drawings to reference like features.

DETAILED DESCRIPTION

Application-managed file versioning is discussed herein. An operating system of a computing device supports file versioning, exposing functionality to applications running on the computing device that allows the applications to manage file versions including creating new versions of files. The applications determine when a new version of a file is to be created, with different applications using different criteria to make this determination. To create a new version, the application invokes the functionality exposed by the operating system, which in turn saves a new version of the file. This new version of the file is saved with a name derived from the standardized naming convention in a known location using a particular filename format, with the combination of this known location and the particular filename format allowing the new version of the file to be subsequently identified as a version of that particular file.

Example System and Operation

Figure 1:
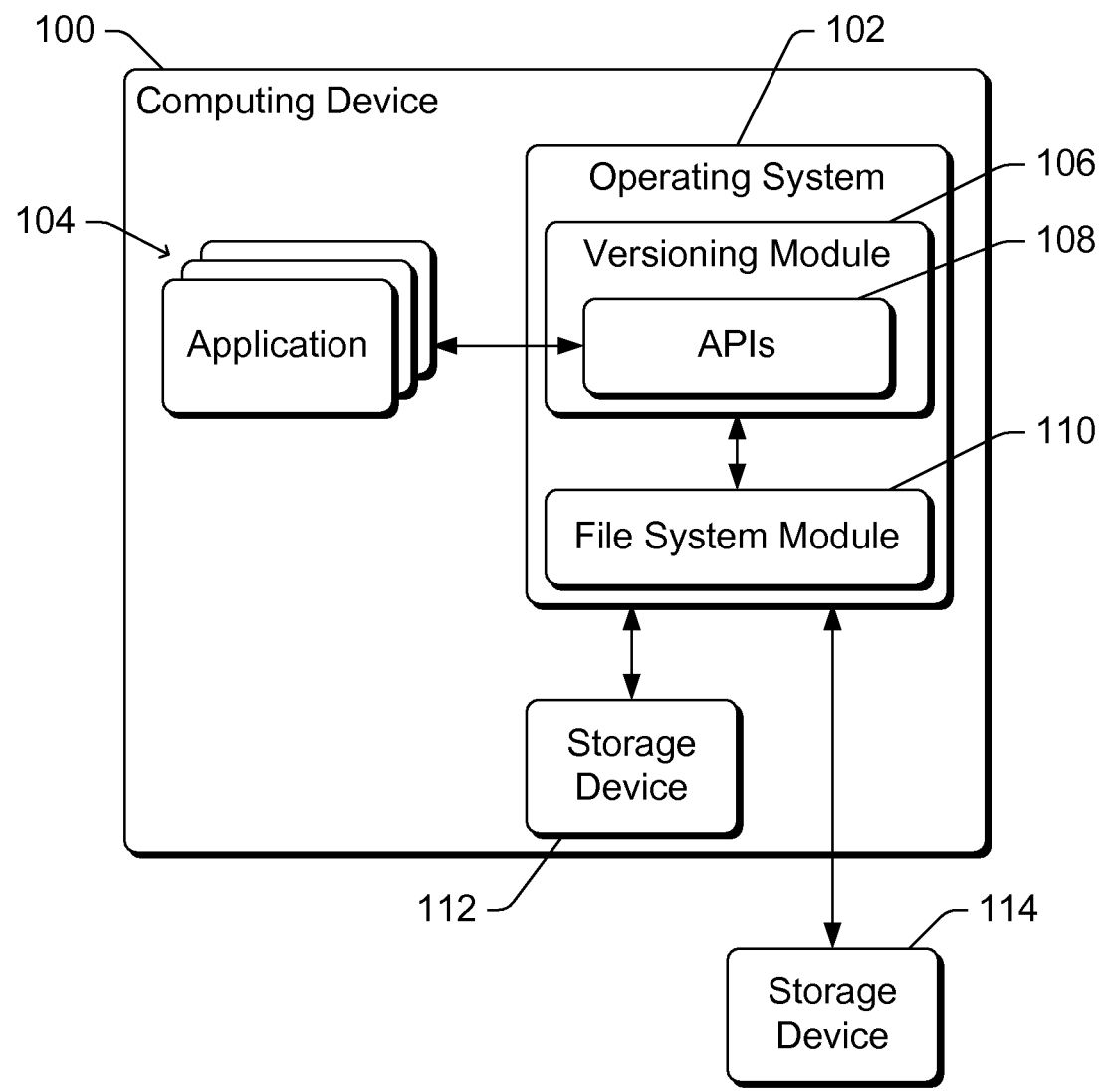
FIG. 1 is a block diagram illustrating an example computing device implementing the application-managed file versioning in accordance with one or more embodiments.

FIG. 1 is a block diagram illustrating an example computing device 100 implementing the application-managed file versioning in accordance with one or more embodiments. Computing device 100 can be a variety of different devices that are capable of accessing files. For example, computing device 100 can be a desktop computer, a mobile station, an entertainment appliance, a set-top box communicatively coupled to a display device, a television, a wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles, cell phones).

Computing device 100 includes an operating system 102 and one or more applications 104 running thereon. Operating system 102 and applications 104 are typically implemented as software or firmware instructions that are stored in one or more memories and executed by one or more processors of computing device 100. Alternatively, operating system 102 and/or applications 104, or portions thereof, can be implemented in other manners, such as in hardware.

Operating system 102 includes a versioning module 106 exposing functionality to applications 104. In the illustrated example of FIG. 1, this functionality is exposed via one or more application programming interfaces (APIs) 108. It is to be appreciated that APIs 108 are only one example way in which applications 104 can access functionality of versioning module 106. Other techniques can alternatively be used, such as Component Object Model (COM) technologies, Microsoft® .NET connection software, different technologies for allowing processes and/or functions to be invoked, and so forth.

Operating system 102 also includes a file system module 110 that saves, retrieves, and deletes versions of files as directed by versioning module 106. Although illustrated as a separate module external to file system module 110, versioning module 106 can alternatively be included as part of file system module 110. Additionally, although illustrated as being part of operating system 102, versioning module 106 could alternatively be implemented external to operating system 102.

Versioning module 106 directs file system module 110 to save versions of files, retrieve versions of files, and delete versions of files, based at least in part on direction received from applications 104 via APIs 108. File system 110 stores versions of files on a storage device 112 included as part of computing device 100, and/or a storage device 114 external to computing device 100. Each storage device 112 and/or 114 can be a variety of different devices on which files can be stored, such as a magnetic or optical disk, flash memory, and so forth.

Each application 104 can access multiple files managed by file system 110, and each of these multiple files can have multiple corresponding versions. A version of a file refers to a copy of the file saved at some point in time, and changes made to the file after saving that version of the file are not included in the file. So, if a user decides that he or she wants to recover a paragraph of a document that he or she deleted after saving the version of the file, that saved version can be accessed and the desired paragraph recovered.

In one or more embodiments the initially created file is used as the file to which changes are made, and copies of that file are saved at the appropriate times as versions of that file. For example, a user may request creation of a new word processing document, with additions and/or deletions of text being made to that originally created document. When a new version of the document is to be created, a copy of that document as it exists at the time of creating the new version is generated and saved. Subsequent additions and/or deletions of the text continue to be made to the originally created document.

In other embodiments, the initially created file is kept unchanged, and changes made by the user are made to a version of that file. For example, a photo editing application may access a digital picture. This digital picture is viewed by the application as the original document. A new version of that original document is created and edits made by the user are made to that original document. When a new version of the document is to be created, the currently used version is saved and a new version is created, with subsequent edits to the digital picture being made to the newly created version.

Each application 104 manages the versions of the files that it opens, edits, and/or otherwise accesses. This management includes requesting that new versions of files be saved, requesting that particular versions of files be deleted, recovering data from previously created versions of files, and so forth.

As part of this management an application 104 determines when a new version of a file is to be saved. In one or more embodiments this determination is made automatically by application 104 and can be made based on a variety of different criteria as discussed in more detail below. Different applications 104 can employ different criteria to determine when a new version of a file is to be saved. When an application 104 determines that a new version of a file is to be saved, the application 104 sends a request to versioning module 106 to save a new version of the file. This request can be sent in a variety of different manners, and in one or more embodiments is sent by invoking one or more of APIs 108. In response to this request, versioning module 106 saves the requested new version of the file using file system module 110.

Also as part of this management an application 104 determines when a version of a file is to be deleted or purged. As discussed in more detail below, the number of versions that can be maintained for a particular file may be limited in some embodiments. Application 104 enforces such limits by deleting one or more versions of a file so that such limits are not exceeded.

Figure 2:
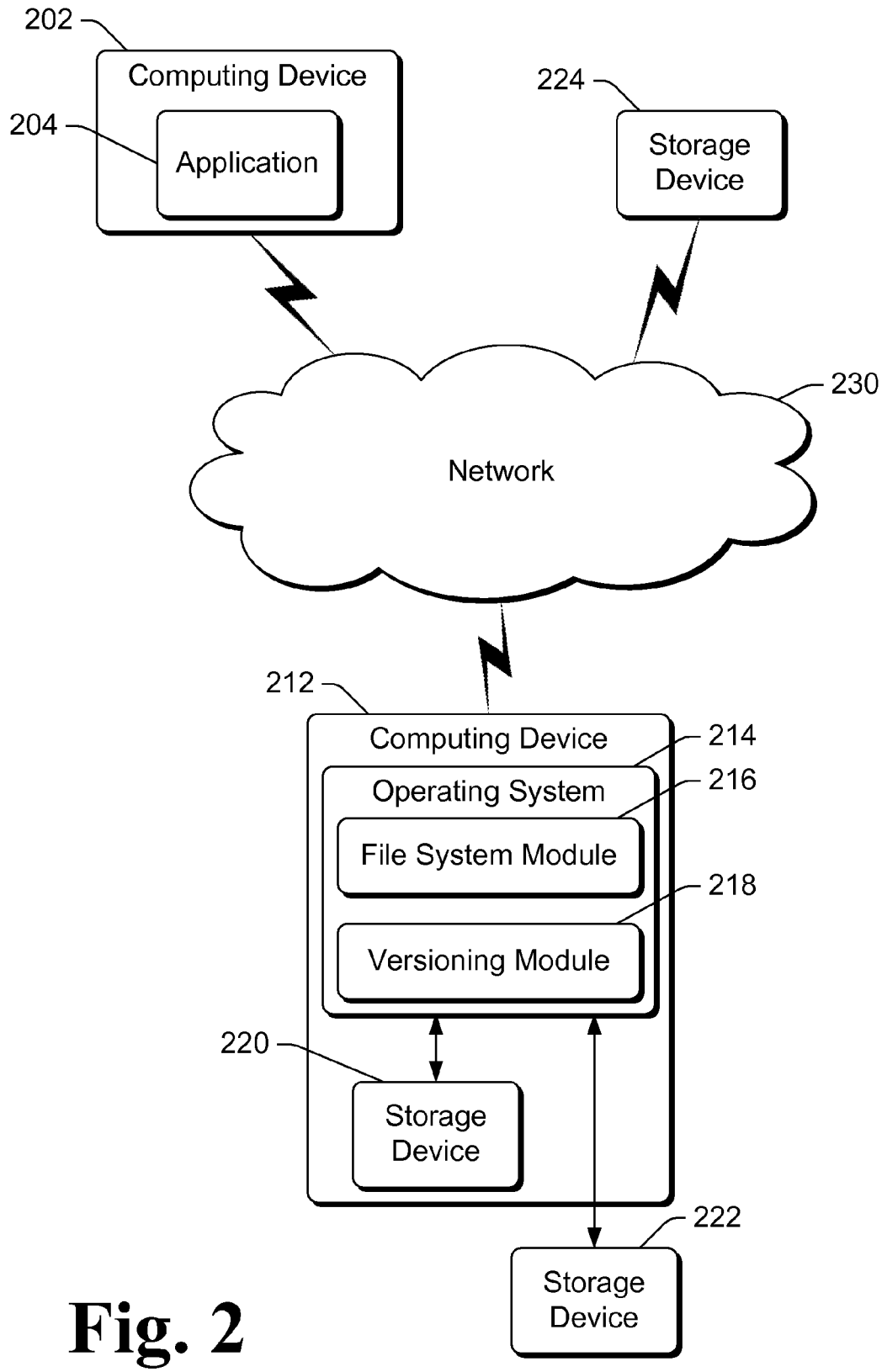
FIG. 2 illustrates an example system implementing the application-managed file versioning in accordance with one or more embodiments.

FIG. 2 illustrates an example system 200 implementing the application-managed file versioning in accordance with one or more embodiments. System 200 includes a computing device 202 running an application 204, and a computing device 212 running an operating system 214. Operating system 214 includes a file system 216 and a versioning module 218. Versioning module 218 supports communication between devices using a variety of different protocols, such as SOAP technologies, Distributed COM (DCOM) technologies, Microsoft® .NET connection software, different technologies for allowing requests to be received, and so forth. Analogous to the discussion above regarding FIG. 1, although versioning module 218 is illustrated as being included in operating system 214 and external to file system module 216, versioning module 218 can alternatively be included in file system module 216 or can be external to operating system 214.

File versions can be managed in system 200 similar to that discussed with respect to computing device 100 of FIG. 1, except that the application requesting saving of the new version, retrieving versions, and deleting versions is running on a different computing device than versioning module 218. Accordingly, application 204 sends a request to a different computing device rather than accessing functionality on the same device as application 204 is running.

Upon receipt of a request to save a new version of a file, versioning module 218 directs file system 216 to save the file to a storage device 220 that is included as part of computing device 212, or alternatively on a storage device that is external to computing device 212. A storage device external to computing device 212 can be directly coupled to computing device 212, such as storage device 222. Alternatively, computing device 212 can access a storage device 224 via a network 230.

Computing devices 202 and 212 can communicate with one another, as well as with a storage device 224 (e.g., a file server), via network 230. Network 230 can be a variety of different networks, including the Internet, a local area network (LAN), a public telephone network, an intranet, other public and/or proprietary networks, combinations thereof, and so forth.

Returning to FIG. 1, each version of a file is saved by file system 110 as a separate file from other versions of the file. In one or more embodiments, each version of a file is saved with a read-only attribute marked, preventing changes from being written to the file after it is created. The filename for a version of a file conforms to a particular format including two or more portions. One portion of the format stores at least a portion of a name of the file, and another portion of the format stores data indicating that the new version of the file is a version of the file.

Having at least a portion of the name of the file included in the filename of a version of the file allows the version relationship between the file and each version of the file to be easily identified. No separate record need be kept to maintain this relationship as it is inherent in the filenames. The data indicating that the new version of the file is a version of the file allows different versions of the file to be easily distinguished, as well as to distinguish the versions of the file from the file itself.

Additionally, in one or more embodiments the versions of a file are stored in a known location by file system 110 as directed by versioning module 106. Versioning module 106 uses particular criteria or rules to determine where this location is. In one or more embodiments, this known location is a sub-directory of the directory in which the file is stored, this sub-directory having a known name such as "versions". In other embodiments, this known location is elsewhere, such as in the same directory as the directory in which the file is stored, some other directory or location, and so forth. These locations, however, are only examples; the application-managed file versioning discussed herein is not limited to these example locations, and other locations can alternatively be used.

The following illustrates an example standardized format for the version filenames. It is to be appreciated that this is an example standardized format; the application-managed file versioning discussed herein is not limited to this example format, and other formats can alternatively be used. In one or more embodiments, the standardized format for the version filenames of a file named "<filename>.<extension>" is:

"<filename>@(<timestamp>)(<flag>[-tag]).<extension>"

Following this format for version filenames, the "<filename>" portion of the version filename corresponds to the "<filename>" of the name of the file for which the version is created, and the "<extension>" portion of the version filename corresponds to the "<extension>" of the name of the file for which the version is created.

The "<timestamp>" portion identifies a date and time at which the version of the file is created. In one or more embodiments the "<timestamp>" portion is based on Greenwich Mean Time (GMT), and an indication of such is included in the filename (or alternatively can be assumed). In one or more embodiments, the "<timestamp>" portion is based on the Gregorian calendar, and can have a variety of different formats, such as:

"GMT YYYY-MM-DD HH-MM-SS"
"YYYYMMDDHHMMSS"
"GMT YYYYMMDDHHMMSS"
a string representation of a decimal or hexadecimal value of <FILETIME>, where <FILETIME> is a value representing the number of 100-nanosecond intervals since a known start time (e.g., Jan. 1, 1601 (UTC—coordinated universal time))

In these example formats, "YYYY" refers to a year, one occurrence of "MM" refers to a month (e.g., the first occurrence of "MM" after "YYYY"), "DD" refers to a day, "HH" refers to an hour, another occurrence of "MM" refers to minutes (e.g., the first occurrence of "MM" after "HH"), and "SS" refers to seconds.

The "<flag>" portion is one or more characters used to associate specific information with this version. Which particular flag, if any, is to be set is indicated by the application requesting creation of the new version. In one or more embodiments, a flag character of "p" is used to indicate that a particular version is flagged as pinned, and a default character (e.g., "n") is used to indicated there is no flag for this version. A version flagged as pinned indicates to the user and/or versioning module that the version is of particular importance and can be treated differently by the versioning module as discussed in more detail below. For example, an original digital picture stored by the application can be flagged as pinned, allowing that original digital picture to be readily identified separately from other versions of the file.

A variety of other flags can also be used. For example, an auto-versioning flag can be used to indicate that the versioning module is to perform auto-versioning as well as the application-managed file versioning discussed herein. With auto-versioning, the versioning module automatically generates versions of the file at particular intervals (e.g., every fifteen minutes, hourly, daily, etc.) in addition to versions created in response to application requests.

The "<tag>" portion is optional. When included, the "<tag>" portion includes one or more characters that tag this version with specific information. Certain characters can be restricted from use, such as '(', ')', the hyphen '-', the dot '.', the '@', other characters that are not legal in a file name, and so forth. In one or more embodiments, the default value of <Tag> is " " (an empty string), indicating that there is no tag for this version.

The tag portion allows the application requesting creation of the new version of the file, or a user of that application, to provide metadata regarding the file version. Various different metadata can be included, such as "version 1", "final version", "ready for review", "Matts comments", and so forth. The particular data to be included in the tag portion, if any, is indicated by the application requesting creation of the new version.

The following are example formats of the version filenames. However, it is to be appreciated that these are only examples; the application-managed file versioning discussed herein is not limited to these specific formats, and any of a variety of other formats can alternatively be used. For example, a version of foo.doc taken at Jul. 5, 2007 at 14:55 GMT and flagged as pinned and with a tag of "Matts Comments" could be:

foo@(GMT 2007-07-05 14-55-00)(p-Matts Comments).doc

A version of foo.doc taken at Jul. 5, 2007 at 14:55 GMT without a flag and without a tag could be:

foo@(GMT 2007-07-05 14-55-00)(n).doc

A version of foo.doc taken at Jul. 5, 2007 at 14:55 GMT without a flag and with a tag of "Matts Comments" could be:

foo@(GMT 2007-07-05 14-55-00)(n-Matts Comments).doc

Figure 3:
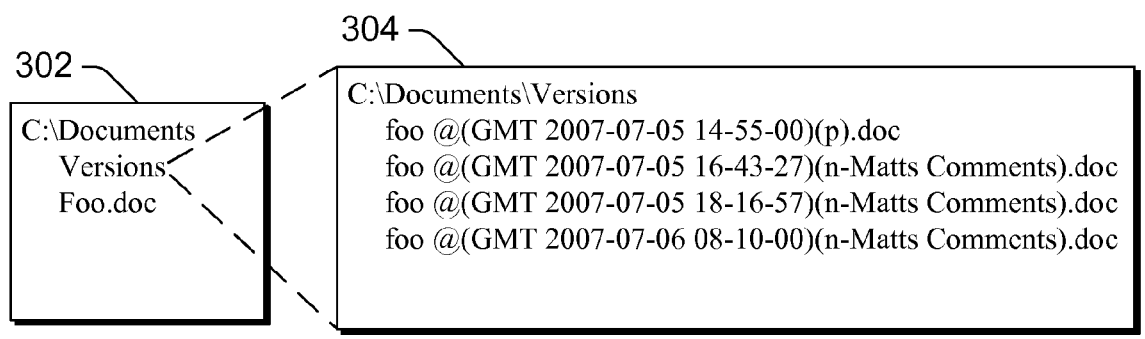
FIG. 3 illustrates an example of storing different versions of a file in accordance with one or more embodiments.

Alternatively, using other formats, a version of foo.doc taken at Jul. 5, 2007 at 14:55 GMT without a flag and with a tag of "Matts Comments" could be one of the following:

foo@(20070705145500)(n-Matts Comments).doc
foo@(GMT 20070705145500)(n-Matts Comments).doc
foo@(000000007a58b8c0)(n-Matts Comments).doc FIG. 3 illustrates an example of storing different versions of a file in accordance with one or more embodiments. A directory 302 named "C:\Documents" includes a sub-directory named "Versions" and a file named "Foo.doc". The "Versions" sub-directory 304 includes multiple versions of the document "Foo.doc" conforming to the filename format discussed above. It is to be appreciated that the directories 302 and 304 are only examples, and that different locations for storing the different versions of the file and different filename formats can alternatively be used as discussed above. Additionally, the use of the sub-directory named "Versions" is only an example and any other desired name can be used. Such names can be predefined by the versioning module, can be a configurable option such that a user of a computing device can change the name, and so forth.

Returning to FIG. 1, the designer of an application 104 is typically most knowledgeable about what makes sense or is logical in determining when to create a new version of a file, and thus the designer of the application 104 (and thus the application 104) is typically in a better position to determine when to create a new version of a file than versioning module 106 is. Accordingly, an application 104 determines when a new version of a file is to be created in response to particular application-specific events.

The application 104 can employ a variety of different criteria in determining when a new version of a file is to be created in response to particular application-specific events, and different applications 104 can employ different criteria. Examples of events for which an application 104 can determine to create a new version include opening a file, receiving a user request that a file be saved, ending of an editing session, making of a significant change to a file (e.g., deleting a paragraph, deleting a worksheet or page, cropping an image, performing red-eye correction performed on a digital image, etc.), and so forth. In response to one of these events occurring, the application automatically determines that a new version of the file is to be saved; no manual input from a user of the application 104 need be received in order for the new version of the file to be saved. Additionally, in one or more embodiments the application-specific event can be a manual event triggered by a user, such as a user request to create a new version of a file.

In one or more embodiments, each application 104 is expected to have a limit on a number of versions (e.g., 5 versions, 20 versions, etc.) it will maintain for each file. In such embodiments, each application 104 is expected to delete versions as appropriate when new versions are created so that this limit is not exceeded. In response to a request received from an application 104 to create a new version of a file, versioning module 106 can optionally return an indication that the limit has been exceeded and that the application 104 is to delete one or more versions of the file. The application 104 can request that versioning module 106 delete one or more versions in a variety of different manners, such as by invoking one or more of APIs 108. In one or more embodiments versioning module 106 can refuse to create the new version of the file until one or more versions of the file have been deleted.

However, in one or more embodiments situations can arise where this limit is not maintained by each application 104. In such situations, versioning module 106 can optionally employ an automated clean-up process to delete versions of the file so that the limit is not exceeded. Versioning module 106 can use various criteria to determine which versions to delete, such as deleting the oldest versions first, not deleting versions that are flagged as pinned, and so forth.

Versioning module 106 can also employ such an automated clean-up process to delete file versions in different situations. For example, situations can arise where the original file corresponding to the file versions has been deleted or moved, but the file versions remain. In such situations, these remaining file versions can be deleted by the automated clean-up process (optionally only if the remaining file versions are not flagged as pinned). By way of another example, one or more versions could be deleted as part of a disk clean-up process to increase the usable storage space on a storage device. In such situations, the user could be given an option to "clean-up versions" in order to recover storage space on the storage device.

Additionally, situations can arise where a user decides to delete one or more versions. This can be performed manually by the user, such as the user navigating to the folder in which the versions are stored and selecting a "delete" option. This can also be automated for the user, such as an application 104 providing a user interface via which the user can select to delete one or more versions of a file. In one or more embodiments, constraints can be placed on the deletion of certain versions (such as those flagged as pinned), in which case versioning module 106 does not delete such versions, displays a warning to the user about deletion of the version, and so forth.

In one or more embodiments, a user interface is presented to the user giving the user access to the versions. The user interface allows versions to be deleted as discussed above. Additionally, the user interface can allow the user to perform other actions, such as open previous versions of a file, restore a particular file to a previous version of the file, copy versions of a file to another storage device, and so forth. This user interface can be presented in different manners. For example, the user interface can be part of a normal shell or file navigation user interface, via a previous versions window or tab that can be displayed when a file or version of a file is selected by the user, via an interface of an application 104, and so forth.

The user interface can also display versions of files generated in different manners. File versions can also be generated in different manners, such as using any of a variety of different legacy techniques, such as shadow copy techniques supported by some operating systems that create versions of files at particular intervals (e.g., daily). Such shadow copy versions can coexist with the application-managed file versions created using the techniques discussed herein. In embodiments where multiple file versioning techniques are employed, the user interface can give the user access to the versions generated by the various different techniques employed.

Additionally, situations can arise where a file having one or more file versions is also pointed to by a symbolic link and/or a hard link. Both symbolic and hard links are mechanisms for pointing to files, but are typically treated differently by file system 110. For example, a symbolic link to a file points to that file, but allows that file to be accessed only so long as the file is not deleted or moved. A hard link to a file, however, points to that file and allows that file to continue to be accessed until the hard link is deleted (even if the pointed-to file is deleted or moved, the file can still be accessed via the hard link). In one or more embodiments, file system 110 allows both symbolic links and hard links to file versions to be created.

Figure 4:
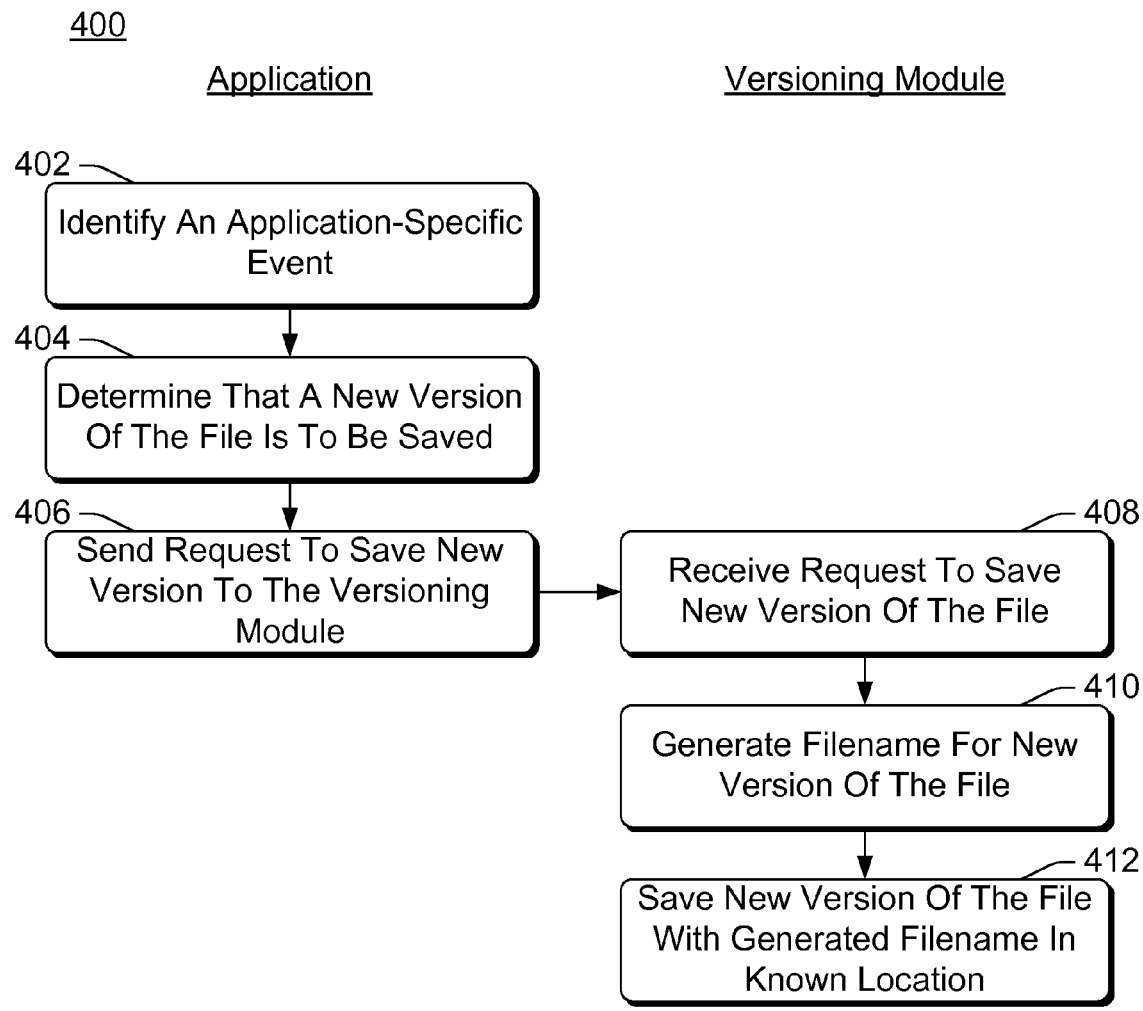
FIG. 4 is a flowchart illustrating an example process for application-managed file versioning.

FIG. 4 is a flowchart illustrating an example process 400 for application-managed file versioning. Process 400 can be implemented in software, firmware, hardware, or combinations thereof. Acts of process 400 illustrated on the left-hand side of FIG. 4 are carried out by an application, such as application 104 of FIG. 1 or application 204 of FIG. 2. Acts of process 400 illustrated on the right-hand side of FIG. 4 are carried out by a versioning module, such as versioning module 106 of FIG. 1 or versioning module 218 of FIG. 2. It is to be appreciated that the locations where the acts of process 400 are performed are only examples; the application-managed file versioning discussed herein is not limited to these specific locations, and the acts can be performed in any of a variety of other locations. Process 400 is an example process for application-managed file versioning; additional discussions of application-managed file versioning are included herein with reference to different figures. Initially, an application-specific event is identified by an application (act 402), and the application determines that a new version of the file is to be saved (act 404) in response to the identified event. As discussed above, a variety of different criteria can be used to identify which one or more events are to result in new versions of the file being automatically created, and these criteria can vary for different applications. Also as discussed above, the application-specific event can be a manual event triggered by a user, or can be another event resulting in the application automatically determining that a new version of the file is to be saved.

In response to determining that a new version of the file is to be saved, a request to save a new version of the file is sent to the versioning module (act 406). As discussed above, this sending of the request can be invoking of an API exposed by the versioning module, or alternatively other request mechanisms. The application can include as part of this request various information, such as metadata (e.g., for a tag portion of the filename), flags to be included in the filename, and so forth.

The versioning module receives the request to save a new version of the file (act 408). In response to this received request, the versioning module generates a filename for the new version of the file (act 410). As discussed above, this generated filename conforms to a particular format including two or more portions. The new version of the file is then saved with the filename generated in act 410 in a known location (act 412). This saving is performed, for example, by the versioning module directing a file system to store the new version of the file with the filename generated in act 410 in the known location. As discussed, this known location can vary by implementation, and can be determined using various criteria or rules.

Figure 5:
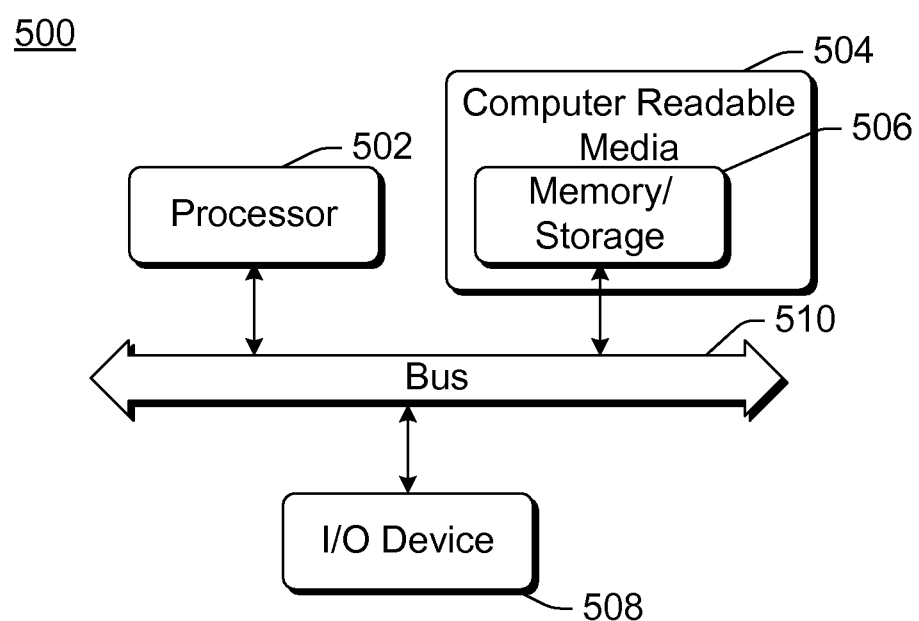
FIG. 5 illustrates an example computing device that can be configured to implement the application-managed file versioning in accordance with one or more embodiments.

FIG. 5 illustrates an example computing device 500 that can be configured to implement the application-managed file versioning in accordance with one or more embodiments. Computing device 500 can be, for example, a computing device 100 of FIG. 1, or a computing device 202 or 212 of FIG. 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or I/O device(s) 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 5. The features of the application-managed file versioning techniques described herein are platform-independent, meaning that the techniques can be implemented on a variety of commercial computing platforms having a variety of processors.

As discussed above, one or more APIs can be exposed by the versioning module to carry out the application-managed file versioning techniques discussed herein, such as APIs 108 of FIG. 1. The following are examples of APIs that can be exposed by the versioning module. In one or more embodiments these example APIs are used with one or more of the family of Windows® operating systems available from Microsoft Corporation of Redmond, Wash. It is to be appreciated that these are only examples, and that other APIs could be used and/or functionality exposed in different manners.

APIs for Creating File Versions

Creation of a new version of a file is supported through two APIs: the ReplaceFile API and the SaveFileVersion API.

The ReplaceFile API is used by applications for "safe save". The ReplaceFile API allows replacing one file with another file, with the option of creating a backup copy of the original file. The replacement file assumes the name of the replaced file and its identity.

```
BOOL WINAPI ReplaceFile(
    _in LPCTSTR lpRelacedFileName,
    _in LPCTSTR lpRelacementFileName,
    _in LPCTSTR lpBackupFileName,
    _in DWORD dwReplaceFlags,
    _in LPVOID lpExclude,
    _in LPVOID lpReserved );
```

The parameters of the ReplaceFile API are:
lpRelacedFileName
   [in] The name of the file that is being replaced.
lpRelacementFileName
   [in] The name of the file that will replace the lpReplacedFileName file.
lpBackupFileName
   [in] The name of the file that will serve as a backup copy of the lpReplacedFileName file. If this parameter is NULL, no backup file is created.
dwReplaceFlags
   The replacement options. Besides the existing options, the new option that triggers file version creation is REPLACEFILE_SAVE_VERSION, which informs this API to create a file version based on the current time stamp before the lpRelacedFileName file is replaced. In one or more implementations, this flag cannot be specified if the lpBackupFileName parameter is not NULL.
lpExclude
   [in] Reserved for future use.
lpReserved
   When REPLACEFILE_SAVE_VERSION is specified in dwReplaceFlags, this parameter supports an optional pointer to the REPLACEFILE_PARAMS structure.

```
typedef struct _REPLACEFILE_PARAMS {
    DWORD dwSize;
    DWORD cchFileVersionNameLength,
    LPTSTR lpFileVersionName,
    LPCTSTR lpVersionTag,
    DWORD dwVersionFlags
} REPLACEFILE_PARAMS, *PREPLACEFILE_PARAMS
```

The parameters of the REPLACEFILE_PARAMS structure are:
dwSize
   [in] Size of this REPLACEFILE_PARAMS structure
lpVersionTag
   [in] A tag string for the version. In one or more implementations the tag string is defined as discussed above with reference to the tag portion. It cannot contain characters that are not legal in a filename. If the version is not tagged then this parameter is "\0".
dwVersionFlags
   [in] Version Flags.
   If dwVersionFlags=0 or FILE_VERSION_FLAG_NONE, a file version without a flag is to be saved.
   If dwVersionFlags=FILE_VERSION_FLAG_PINNED, a file version with the pinned flag is to be saved.
   dwVersionFlags may be a combination of the valid flags, but note FILE_VERSION_FLAG_NONE are mutually exclusive with other flags.
lpFileVersionName
   [out] A pointer to a buffer that receives the name of the file version that is to be created. This parameter is optional and may be NULL.
cchFileVersionNameLength
   [inout] The size of the lpFileVersionName buffer in characters. If the lpFileVersionName parameter is NULL, then this parameter is set to 0. If the size is not large enough to receive the name of the generated file version, this size parameter will be used to return the minimum required size in characters.
   To save a version the caller of ReplaceFile will call the ReplaceFile API with the REPLACEFILE_SAVE_VERSION flag set. If the caller wants to tag that version then the caller will specify the tag in the lpVersionTag parameter in the REPLACEFILE_PARAMS. The API when invoked with the REPLACEFILE_SAVE_VERSION flag set will fail if a version cannot be created for some reason. If the number of versions for the file exceeds the number of versions allowed for a file, then the API will fail with an error code (ERROR_VERSION_LIMIT_EXCEED) to indicate this condition. If the caller does not need to specify a parameter defined in REPLACEFILE_PARAMS, then the lpReserved parameter can be NULL. The lpFileVersionName parameter in REPLACEFILE_PARAMS returns the name of the version created by this API. The caller can use this name to do further processing on the newly created version.
   The SaveFileVersion API supports creation of a version by applications that do not use ReplaceFile for "safe save". The SaveFileVersion API is defined as follows:

```
BOOL WINAPI SaveFileVersion(
    _in LPCTSTR lpFileName,
    _in DWORD dwSaveFlags,
    _in DWORD dwVersionFlags,
    _in LPCTSTR lpVersionTag,
    _in LPCTSTR lpFileNameToSaveAsVersion,
    _in_opt HANDLE hTransaction,
    _out_ecount_opt(*lpFileVersionNameLength)
    lpFileVersionNameBuffer,
    _in LPDWORD lpFileVersionNameLength,
    _in LPVOID lpReserved );
```

The parameters of the SaveFileVersion API are:
lpFileName
   [in] The name of the file whose version is to be created
dwSaveFlags
   [in] Reserved for future use.
dwVersionFlags
   [in] Flags for the version.
   If dwVersionFlags=0 or FILE_VERSION_FLAG_NONE, a file version without a flag is to be saved.
   If dwVersionFlags=FILE_VERSION_FLAG_PINNED, a file version with the pinned flag is to be saved.
   dwVersionFlags may be a combination of the valid flags, but note FILE_VERSION_FLAG_NONE are mutually exclusive with other flags.
lpVersionTag,
   [in] A tag string of the version. If the version is not to be tagged then this parameter is set to "\0" or NULL.
lpFileNameToSaveAsVersion
   [in] The name of the file to be used as a version for lpFileName. This parameter is optional and can be NULL.
hTransaction
   [in] A handle to a transaction this operation is to be part of This parameter is optional.
lpFileVersionNameBuffer
   [out] A pointer to a buffer that receives the name of the file version that is to be created. This parameter is optional may be NULL.
lpFileVersionNameLength
   [in] When it is not NULL, it is a pointer to the length of the lpFileVersionNameBuffer in characters. In output, it is used to return the number of characters that is copied to the lpFileVersionNameBuffer.
   If the lpFileVersionNameBuffer parameter is present, lpFileVersionNameLength is not NULL; *lpFileVersionNameLength is greater than 0. If the lpFileVersionNameBuffer parameter is NULL and lpFileVersionNameLength is not NULL, or if the lpFileVersionNameBuffer parameter is present and its buffer length by lpFileVersionNameLength is not large enough, this API will set the last error ERROR_INSUFFICIENT_BUFFER and use the lpFileVersionName- Length to return the required buffer length in the number of characters (including the terminating null).
lpReserved
 [in] Reserved for future use.

Using the SaveFileVersion API, if the caller wants to tag a version then the caller will specify the flag and/or tag in the dwVersionFlags and/or lpVersionTag parameter. If the number of versions for the file exceeds the number of versions allowed for a file, then the API will fail with an error code (ERROR_VERSION_LIMIT_EXCEED) to indicate this condition. If lpFileNameToSaveAsVersion is not NULL then the temp file specified by lpFileNameToSaveAsVersion will be used as a version of the file specified by lpFileName. The temp file is expected to be identical to the file that would be passed to the ReplaceFile API. The SaveFileVersion API will take care of propagating properties from lpFileName to lpFileNameToSaveAsVersion. If lpFileNameToSaveAsVersion is NULL then the API will create a copy of the file specified by lpFileName as a version of lpFileName. The lpFileVersionNameBuffer parameter returns the name of the version created by this API. The caller can use this name to do further processing on the newly created version.

APIs for Purging File Versions

The PurgeFileVersions API purges (deletes) versions of the file. PurgeFileVersions The API is defined as follows:

```
BOOL WINAPI PurgeFileVersions(
    _in LPCTSTR lpFileName,
    _in DWORD dwPurgeFlags,
    _in DWORD nVersionsToKeep,
    _in_opt PFILETIME lpVersionTimeToKeep,
    _in DWORD dwVersionsFlagsToPurge,
    _in_ecount_opt(nTagsToPurge) LPCTSTR
      lpVersionTagsToPurge[ ],
    _in DWORD nTagsToPurge,
    _in_opt HANDLE hTransaction,
    _out_opt DWORD lpNumberOfVersionsPurged,
    _in LPVOID lpReserved );
```

The parameters of the PurgeFileVersions API are:
lpFileName
 [in] The name of the file whose versions are to be deleted. It can be a file name or a name with wild cards.
dwPurgeFlags
 [in] Reserved for future use.
nVersionsToKeep
 [in] The number of versions that are to be preserved.
lpVersionTimeToKeep
 [in] The time before which versions will be deleted. This parameter may be NULL
dwVersionFlagsToPurge
 [in] The purge options to specify whether to purge versions that are tagged as 'important', 'non-important' or some combination.
 If dwVersionFlagsToPurge=0, this parameter will be ignored. It indicates that matching versions with/without a flag are to be purged;
 If dwVersionFlagsToPurge=FILE_VERSION_FLAG_NONE, versions without a flag are to be purged;
 If dwVersionFlagsToPurge=FILE_VERSION_FLAG_PINNED, versions with the pinned flag are to be purged;
  dwVersionFlagsToPurge may be a combinations of the valid flags. Note that for this API, FILE_VERSION_FLAG_NONE and FILE_VERSION_FLAG_PINNED can co-exist to indicate to purge versions with pinned flag and without a flag.
lpVersionTagsToPurge
 [in] The list of tags to operate on. Each element of the array specifies one tag in this list of tags. Versions that are tagged with the tags listed in this array are included in the list of candidate versions to purge. "\0" is also a valid tag to purge. It indicates to purge versions without a tag. "\0" can coexist with other tag strings in the list. If the lpTagsToPurge parameter is NULL, then the purge operation will apply to versions irrespective of their version tag. Note wildcards are not supported in the tag string.
nTagsToPurge
 [in] The number of tags in the lpVersionTagsToPurge array. This parameter is ignored if lpTagsToPurge is NULL.
hTransaction
 [in] A handle to a transaction this operation is to be part of. This parameter is optional.
lpNumberOfVersionsPurged
 [out] An optional parameter to return the number of versions are purged if this functions succeeds.

Using the PurgeFileVersions API, the dwNumberOfVersionsToKeep determines the number of versions that will be retained as follows:

```
dwNumberOfVersionsToKeep == 0 => Delete all version
dwNumberOfVersionsToKeep == N => Delete all except the last
  N versions
dwNumberOfVersionsToKeep == MAX_DWORD => Ignore
  this parameter
```

The number of versions specified does not include the original file (latest version of the file). This API does not delete the original file.

The lpVersionTimeToKeep determines the oldest version that will be retained based on the time the version was taken. Versions taken before the time represented by lpVersionTimeToKeep will be deleted. If this parameter is NULL, then it will be ignored. The candidates of the versions of the file preserved is a union of the criteria specified by dwNumberOfVersionsToKeep and lpVersionTimeToKeep. The list of flags/tags to operate on, specified by dwVersionsToPurge and lpVersionTagsToPurge, determines the versions this purge operation applies to. lpFileName is the full path to the file whose versions are to be deleted.

APIs for Identifying File Versions

The CheckIsFileVersionName API returns if the specified file name is a version of a file. This allows an application to identify versions of files when it enumerates a directory. The CheckIsFileVersionName API is defined as follows:

```
BOOL WINAPI CheckIsFileVersionName(
    _in LPCTSTR lpVersionFileName,
    _out LPBOOL pbVersionedName,
    _out_opt PWIN32_FILE_VERSION_INFO lpVersionInfo,
    _in LPVOID lpReserved );
```

The parameters of the CheckIsFileVersionName API are:
lpVersionFileName
 [in] The name that is to be checked.
pbVersionedName
 [out] This parameter receives TRUE if the lpVersionFileName is a valid version name, FALSE otherwise.
lpVersionInfo
 [out] This parameter is optional. It receives the version's base name, flag, tag information. The structure of the returned information is defined as

```
typedef struct _WIN32_FILE_VERSION_INFO {
    DWORD dwSize;
    DWORD dwVersionFlags;
    DWORD dwVersionTagOffset;
    FILETIME ftVersionTime;
    WCHAR cFileBaseName[MAX_PATH];
} WIN32_FILE_VERSION_INFO,
*PWIN32_FILE_VERSION_INFO;
```

The parameters of the WIN32_FILE_VERSION_INFO structure are:
dwSize: the size of the returned structure.
dwVersionFlags: if dwVersionFlags=0, no flag is present; if FILE_VERSION_FLAG_PINNED is present, the version has a pinned flag; FILE_VERSION_FLAG_UNKNOWN is present, the version has an unknown flag, which may be caused by a legacy file version system that is checking a version that has a new flag created in the next version system release.
dwVersionTagOffset: The character offset in the cFileBaseName[MAX_PATH] buffer. The version tag string starts from this offset.
ftVersionTime: the version time stamp at which the version was created.
cFileBaseName: returns the version's base name. This base name is the final component of the file name.

If the CheckIsFileVersionName API returns TRUE then lpVersionFileName is a name of a version of a file. In this case, if lpVersionInfo is supplied then cFileBaseName will return the name of the file whose version is represented by lpVersionFileName; ftVersionTime will return the time that this version was taken; and dwVersionFlags and dwVersionTagOffset will return additional flag/tag information about the version. This API is based on the supplied name and does not check to see if the file or the version actually exists on the volume.

APIs for Enumerating File Versions

These APIs allow an application to enumerate or list versions of files in a directory, and include: a FindFirstFileVersion API, a FindNextFileVersion API, a FindFileVersionDirecotry API, and a FindFileVersionClose API. These APIs are defined as follows:

```
HANDLE WINAPI FindFirstFileVersion(
    _in LPCTSTR lpFileName,
    _in DWORD dwVersionFlagsToFind,
    _in_ecount_opt(nTagsToFind) LPCTSTR lpVersionTagsToFind[ ],
    _in DWORD nTagsToFind,
    _in_opt HANDLE hTransaction,
    _out LPWIN32_FIND_DATA lpFindFileData,
    _in LPVOID lpReserved );
```

The parameters of the FindFirstFileVersion API are:
lpFileName
  [in] The name of the file whose versions is to be enumerated. The final component of the name can contain supported wild cards such as "?" and "*".
dwVersionFlagsToFind
  [in] The flags to be enumerated. If dwVersionFlagsToFind=0, this parameter will be ignored. If it is FILE_VERSION_FLAG_NONE, versions without a flag are to be returned. If it is FILE_VERSION_FLAG_PINNED, versions with the pinned flag are to be returned. It may be a combination of all the valid flags. FILE_VERSION_FLAG_NONE can coexist with other valid flags.

lpVersionTagsToFind
  [in] This parameter specifies the tags array whose versions are to be enumerated. It is optional. If it is NULL, all versions are to be returned. If it is not NULL, only the file versions with the matching tags are to be returned. "\0" is used to represent the absence of a tag. Note the tags containing wildcards are not supported. A tag string with wildcards indicates that file versions with the matched tag are to be returned.
nTagsToFind
  [in] The number of tags in the lpVersionTagsToFind array. This parameter is ignored if lpFindTags array is NULL.
hTransaction
  [in] A handle to a transaction this operation is to be part of. This parameter is optional.
lpFindFileData
  [out] A pointer to the WIN32_FIND_DATA structure that receives information about a found version, where WIN32_FIND_DATA is a well-known data structure that is defined for the existing Win32 FindFirstFile and FindNextFile APIs (additional information regarding the WIN32_FIND_DATA structure is available from Microsoft Corporation).
Return Value:
  If the FindFirstFileVersion function succeeds, the return value is a search handle used in a subsequent call to FindNextFileVersion or FindFileVersionClose. If the function fails, the return value is INVALID_HANDLE_VALUE.

```
BOOL WINAPI FindNextFileVersion(
    _in HANDLE hFindHandle,
    _out LPWIN32_FIND_DATA lpFindData );
```

The parameters of the FindNextFileVersion API are:
hFindFile
  [in] The search handle returned by a previous call to the FindFirstFileVersion function.
lpFindFileData
  [out] A pointer to the WIN32_FIND_DATA structure that receives information about the found file version.

```
DWORD WINAPI FindFileVersionDirectory (
    _in HANDLE hFindHandle,
    _out_ecount_opt(cchBuffer) LPTSTR lpBuffer,
    _in DWORD cchBuffer );
```

The parameters of the FindFileVersionDirectory API are:
hFindFile
  [in] The search handle returned by a previous call to the FindFirstFileVersion function.
lpBuffer
  [out] The path-relative or absolute path name of the directory in which the version is located.
cchBuffer
  [in] The length of the buffer.
If the return value is less than cchBuffer, then the return value is the length of the string copied to the lpBuffer in characters, not including the terminating null character. If the return value is greater than cchBuffer, the return value is the length of the required buffer to hold the parameter.
  The FindFileVersionDirectory API will be called after the caller calls FindFirstFileVersion. The FindFileVersionDirectory API will return the directory in which the File Version is located.

```
BOOL WINAPI FindFileVersionClose (
    HANDLE hFindHandle
);
```

The parameter of the FindFileVersionClose API is:
hFindFile
　　[in] The search handle returned by a previous call to the FindFirstFileVersion function.
APIs for Tagging File Versions
　　The TagFileVersion API support tagging and untagging of existing file versions. The TagFileVersion API is defined as follows:

```
BOOL WINAPI TagFileVersion (
    _in LPCTSTR lpFileVersionName,
    _in DWORD dwVersionFlags,
    _in_opt LPCTSTR lpVersionTag,
    _in_opt HANDLE hTransaction,
    _in LPVOID lpReserved );
```

The parameters of the TagFileVersion API are:
lpFileVersionName
　　[in] The name of the file version which is to be tagged/untagged.
dwVersionFlags
　　[in] The new flags for the version name. If there is already at least one flag in the version name, the new flags will overwrite it. To remove existing flags, FILE_VERSION_FLAG_NONE is specified. If it is 0, this parameter will be ignored.
lpVersionTag
　　[in] The new tag for the version name. If there is already a tag as specified by lpFileVersionName, the new tag will overwrite it. To remove an existing tag, the tag is set to "\0". If it is NULL, this parameter will be ignored.
hTransaction
　　[in] A handle to a transaction this operation is to be part of. This parameter is optional.
lpReserved
　　[in] This parameter is reserved for future use and is currently set to NULL.
APIs for Unifying Application-Managed File Versions and Shadow Copy Versions
　　These APIs allow legacy techniques (in this example, shadow copy versions) supported by previous operating systems to be incorporated with the application-managed file versioning discussed herein. These APIs include: a PverQueryPreviousVersions API, a PverCheckPreviousVersionAvailable API, and a PverGetVersionInformationFromPath API. These APIs are defined as follows:

```
BOOL
PverQueryPreviousVersions (
    _in LPCWSTR lpFilePath,
    _in DWORD dwVersionTypeFlags,
    _in DWORD dwQueryOptions,
    _out PPREVIOUS_VERSIONS_DATA *ppQueryData,
    _reserved LPVOID lpReserved
);
```

The parameters of the PverQueryPreviousVersions API are:
lpFilePath:
　　[in]: This parameter is the file path whose previous versions are to be queried. This path name can be a local path name, a remote full path name with a mapped drive letter, a UNC (Universal Naming Convention) path name or a relative path name either local or remote.
dwVersionTypeFlags:

```
[in]: The valid flags are:
    QUERY_FILE_VERSIONS
    QUERY_SHADOWCOPY_VERSIONS
```

The two flags can co-exist. At least one of the two flags is specified; otherwise, the API will fail with ERROR_INVALID_PARAMETER. QUERY_FILE_VERSIONS indicates the API is to return the application-managed file versioning file versions in the query. QUERY_SHADOWCOPY_VERSIONS indicates the API is to return the shadow-copy versions in the query.
dwQueryoptions:
　　[in]: This parameter is the query option.
The first 8 bits are the enums:

```
QUERY_VERSION_ALL          0x00000000
QUERY_VERSION_EXISTING     0x00000001
QUERY_VERSION_DIFFERENT    0x00000002
```

The bit 9 to bit 16 are query operation flags which can co-exist together.

```
QUERY_VERSION_DIFFERENT_IGNORE_CURRENT 0x00000100
QUERY_VERSIONS_USE_BINARY_SEARCH       0x00000200
```

QUERY_VERSION_ALL indicates to return all the "possibly existing" versions. The reason to have this option is to quickly return all the "possibly existing" versions. For example, if there are 4 snapshots for c:\foo\bar, the returned result will look like \\localshot\C$\@snap1\foo\bar, \\localshot\C$\@snap2\foo\bar, \\localshot\C$\@snap3\foo\bar, and \\ocalshot\C$\@snap4\foo\bar irrespective of whether these versions exist in the corresponding snapshots. Querying all versions using this way avoids mounting the snapshots, which can be very expensive. As a result, the caller may get some non-existing version names. For file versions, the returned version names shall exist at the time of the query.
QUERY_VERSION_EXISTING indicates to return all the existing versions. For shadow-copy versions, the snapshots are mounted to determine whether a version exists in the snapshot. For file versions, they shall exist at the time of the query.
QUERY_VERSION_DIFFERENT indicates to return versions with different last-write-time. Because we query the attribute of the version to determine its last-write-time, this implies that the returned version shall exist.
QUERY_VERSION_DIFFERENT_IGNORE_CURRENT is effective when QUERY_VERSION_DIFFERENT is specified. If this flag is not specified, then versions with the same last-modified-time as the current file will not be returned. If this flag is specified, one of the versions with the same last-write-time as the current file will be returned.
QUERY_VERSIONS_USE_BINARY_SEARCH indicates that the API is to use binary search to expedite the search for unique versions. This binary search is based on the fact that the shadow copies are read only therefore the last-modified-times of the previous versions in the shadow copies have the same order as their shadow copy creation time.

ppQueryData:

[out]: This parameter returns a pointer to the query result data. The buffer is allocated by this API. It is the caller's responsibility to free the data using PverFreeBuffer.

```
typedef struct _PREVIOUS_VERSIONS_DATA {
    DWORD dwType;
    DWORD dwNumberOfVersions;
    PREVIOUS_VERSION_INFO aVersionList[1];
} PREVIOUS_VERSIONS_DATA,
*PPREVIOUS_VERSIONS_DATA;
where dwType = PV_TYPE_PREVIOUS_VERSIONS_DATA.
typedef struct _PREVIOUS_VERSION_INFO {
    DWORD dwFlags;
    LPWSTR lpVersionPathName;
    FILETIME ftVersionTimeStamp;
    WIN32_FILE_ATTRIBUTE_DATA attributes;
} PREVIOUS_VERSIONS_DATA,
*PPREVIOUS_VERSIONS_DATA;
dwFlags returns one of the following values:
    VERSION_SHADOWCOPY_VERSION
    VERSION_FILE_VERSION
``` lpVersionPathName returns a full path name of the version.
ftVersionTimeStamp is the time stamp at which the version was created. For shadow-copy version, this is the time stamp in which the shadow copy is created; For file versioning, this is the time stamp in which the file version is saved.
attributes returns the file system file attributes of the file. It may not contain a value for shadow-copy versions when the query option is QUERY_VERSION_ALL.

The PverQueryPreviousVersions API integrates the shadow copy previous version enumeration and file version enumeration altogether into a unified list. The PverQueryPreviousVersions API will return a subset of the list based on the user specified options.

The PverCheckPreviousVersionAvailable API returns if a previous version is available for the file. The PverCheckPreviousVersionAvailable API is defined as follows:

```
BOOL
PverCheckPreviousVersionAvailable (
    _in LPCWSTR lpFilePath,
    _in DWORD dwVersionTypeFlags,
    _out PBOOL pbAvailable,
    _in LPVOID lpReserved
    );
```

The parameters of the PverCheckPreviousVersionAvailable API are:
lpFilePath:

[in]: This parameter is the file path name to be checked for the availability of its previous versions. This path name can be local full path name, a remote full path name with a mapped drive letter, a UNC path name or a relative path name either local or remote.
dwVersionTypeFlags:

[in]: This parameter is the version types to be checked. The valid flags are: VERSION_FILE_VERSIONS, and VERSION_SHADOWCOPY_VERSIONS. The two flags can co-exist. At least one of the two flags is specified; otherwise, the API will fail with ERROR_INVALID_PARAMETER.
pbAvailable:

[out]: This parameter returns TRUE if the versions are available for the lpFilePath and FALSE otherwise.

The PverGetVersionInformationFromPath API parses the version file path name and returns more information about the version. The PverGetVersionInformationFromPath API is defined as follows:

```
BOOL
PverGetVersionInformationFromPath (
    _in LPCWSTR lpFilePath,
    _out PBOOL pIsVersion,
    _out_opt PFILETIME lpFileTime,
    _out_opt LPDWORD lpVersionType,
    _in LPVOID lpReserved
    );
```

The parameters of the PverGetVersionInformationFromPath API are:
lpFilePath:

[in]: This parameter specifies a file path name to be checked for the version information. For a shadow copy version path name, the path may need to be a full path. For a file version path name, full path and relative path are both valid.
pIsVersion:

[out]: This parameter returns TRUE if the lpFilePath is a version name and FALSE otherwise.
lpFileTime:

[out_opt]: this parameter returns the version creation time. For the shadow copy versions, this is the shadow copy creation time; For the file versions, this is the time stamp that the file version is saved.
lpVersionType:

[out_opt]: This parameter returns the version type: VERSION_FILE_VERSION and VERSION_SHADOWCOPY_VERSION Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer memory storage components having stored thereon multiple instructions that, when executed by one or more processors of a device, cause the one or more processors to implement a versioning module of an operating system executable on the device, the versioning module configured to:

receive, from an application that opens and edits a file, a request associated with an application-managed file versioning of the file to store a new version of the file, the request automatically generated by the application responsive to the application detecting an application-specific event, the versioning module configured to receive requests to store new versions of files from multiple different applications that each employ different criteria to determine when to create the new versions of files;

generate a filename for the new version of the file responsive to the request, the filename including a first portion having at least a portion of a name of the file, and a second portion having data indicating that the new version of the file is a version of the file, the filename further including one or more flags designated by the application to be set in the filename by the versioning module, at least one flag indicating that auto-versioning and application-managed file versioning are to be performed by the versioning module with respect to the new version of the file, the filename further including a timestamp portion that identifies a date and time at which the new version of the file is created;

store the new version of the file; and based on the at least one said flag being set in the filename, perform the auto-versioning by at least automatically generating an additional new version of the file at particular intervals of time.

2. One or more computer memory storage components as recited in claim 1, wherein the application is running on the device.

3. One or more computer memory storage components as recited in claim 1, wherein the filename further includes a tag portion to associate metadata with the new version of the file.

4. One or more computer memory storage components as recited in claim 1, wherein the instructions further cause the one or more processors to expose a set of application programming interfaces (APIs) to the application, the set of APIs including one or more APIs to create the new version of the file, one or more APIs to identify one or more versions of the file, one or more APIs to list the one or more versions of the file, and one or more APIs to delete the one or more versions of the file, and wherein to receive the request is to have the application invoke one of the one or more APIs to create the new version of the file.

5. One or more computer memory storage components as recited in claim 1, wherein the flag indicates that the new version of the file is not to be deleted during an automated clean-up process.

6. One or more computer memory storage components as recited in claim 1, wherein the filename includes a flag that indicates that a user is to be notified about deletion of the new version during an automated clean-up process.

7. One or more computer memory storage components as recited in claim 1, wherein the application is configured to access both the new version of the file and the additional new version of the file using a legacy technique.

8. One or more computer memory storage components as recited in claim 1, wherein the filename includes a tag portion having one or more characters that tag the new version with specific information.

9. A method implemented in a computing device, the method comprising:

receiving at a versioning module, from an application that opens and edits a file, a request associated with an application-managed file versioning of the file to store a new version of the file, the request automatically generated by the application responsive to the application detecting an application-specific event, the versioning module configured to receive requests to store new versions of files from multiple different applications that each employ different criteria to determine when to create the new versions of files;

generating, by the versioning module, a filename for the new version of the file responsive to the request, the filename including a first portion having at least a portion of a name of the file, and a second portion having data indicating that the new version of the file is a version of the file, the filename further including one or more flags designated by the application to be set in the filename by the versioning module, at least one flag indicating that auto-versioning and application-managed file versioning are to be performed by the versioning module with respect to the new version of the file, the filename further including a timestamp portion that identifies a date and time at which the new version of the file is created;

storing the new version of the file; and based on the at least one said flag being set in the filename, performing the auto-versioning by at least automatically generating an additional new version of the file at particular intervals of time.

10. The method as recited in claim 9, wherein the application is running on the computing device.

11. The method as recited in claim 9, wherein the filename further includes a tag portion to associate metadata with the new version of the file.

12. The method as recited in claim 9, wherein the flag indicates that the new version of the file is not to be deleted during an automated clean-up process.

13. The method as recited in claim 9, wherein the filename includes a flag that indicates that a user is to be notified about deletion of the new version during an automated clean-up process.

14. The method as recited in claim 9, wherein the application is configured to access both the new version of the file and the additional new version of the file using a legacy technique.

15. The method as recited in claim 9, wherein the filename includes a tag portion having one or more characters that tag the new version with specific information.

16. The method as recited in claim 9, further comprising exposing a set of application programming interfaces (APIs) to the application, the set of APIs including one or more APIs to create the new version of the file, one or more APIs to identify one or more versions of the file, one or more APIs to list the one or more versions of the file, and one or more APIs to delete the one or more versions of the file, and wherein said receiving the request includes having the application invoke one of the one or more APIs to create the new version of the file.

17. A system comprising:

one or more processors; and one or more computer-readable memory storage components having stored thereon computer-executable instructions which are executable by the one or more processors to implement a versioning module configured to:

receive, from an application that opens and edits a file, a request associated with an application-managed file versioning of the file to store a new version of the file, the request automatically generated by the application responsive to the application detecting an application-specific event, the versioning module configured to receive requests to store new versions of files from multiple different applications that each employ different criteria to determine when to create the new versions of files;

generate a filename for the new version of the file responsive to the request, the filename including a first portion having at least a portion of a name of the file, and a second portion having data indicating that the new version of the file is a version of the file, the filename further including one or more flags designated by the application to be set in the filename by the versioning module, at least one flag indicating that auto-versioning and application-managed file versioning are to be performed by the versioning module with respect to the new version of the file, the filename further including a timestamp portion that identifies a date and time at which the new version of the file is created;

store the new version of the file; and based on the at least one said flag being set in the filename, perform the auto-versioning by at least automatically generating an additional new version of the file at particular intervals of time.

18. The system as recited in claim 17, wherein the application is running on a device that includes the one or more processors.

19. The system as recited in claim 17, wherein the filename further includes a tag portion to associate metadata with the new version of the file.

20. The system as recited in claim 17, wherein the flag indicates that the new version of the file is not to be deleted during an automated clean-up process.

* * * * *